United States Patent [19]
Huang

[11] Patent Number: 6,141,311
[45] Date of Patent: Oct. 31, 2000

[54] ANTI-DUST COVER DRIVING DEVICE FOR A CD PLAYER

[75] Inventor: Jin Yi Huang, Tainan, Taiwan

[73] Assignee: Ya Horng Electronic Co., Ltd., Tainan, Taiwan

[21] Appl. No.: 09/146,213

[22] Filed: Sep. 2, 1998

[51] Int. Cl.[7] ................................................. G11B 33/02
[52] U.S. Cl. ...................................... 369/77.1; 369/75.1
[58] Field of Search ................................. 369/77.1, 77.2, 369/75.1, 75.2

[56] References Cited

U.S. PATENT DOCUMENTS

| | | | |
|---|---|---|---|
| 5,365,506 | 11/1994 | Lee | 369/75.2 |
| 5,572,497 | 11/1996 | Kim et al. | 369/75.2 |
| 5,978,341 | 11/1999 | Jeong | 369/75.2 |
| 6,011,766 | 1/2000 | Nguyen et al. | 369/77.1 |
| 6,014,357 | 1/2000 | Wantanabe et al. | 369/75.2 |
| 6,028,737 | 2/2000 | Khuu | 360/99.06 |

FOREIGN PATENT DOCUMENTS

| | | |
|---|---|---|
| 401013235 | 1/1989 | Japan . |
| 403256233 | 11/1991 | Japan . |

*Primary Examiner*—David L. Ometz
*Assistant Examiner*—Franklin D. Altman
*Attorney, Agent, or Firm*—Pro-Techtor International Services

[57] ABSTRACT

An anti-dust cover driving device for a CD player includes a base body, a laser head base unit mounted on the base body and having a laser head. An anti-dust cover is provided above the base body, moved to hide the laser head or not by a driving device consisting of a gear, a shaft, an activating means, and a power device for rotating the gear and the shaft. The anti-dust cover does not hide the laser head when a CD player cover is closed, but is moved to hide the laser head when the CD player cover is opened by means of the driving device. Therefore, the laser head is always hidden and prevented from having dust fall on it whether the CD player is closed or opened. And the anti-dust cover is moved within a short distance, not moving out of the dimensions of the CD player.

3 Claims, 12 Drawing Sheets

ANTI-DUST COVER DRIVING DEVICE FOR A CD PLAYER

BACKGROUND OF THE INVENTION

This invention relates to a anti-dust cover driving device for a CD player, particularly to one having an anti-dust cover moving in the direction vertical to that of a laser head, shortening the moving distance of the anti-dust cover, not moving out of the dimensions of a base body so that the CD player is minimized in its dimensions and saving the space in the player for installing other components.

As the anti-dust cover of a CD player is located above the laser head, and its driving device has an object of correlative movement of a CD player cover (shielding the opening for placing a CD). When the CD player cover closes, it hides the laser head at the same time, preventing dust from falling on the laser head. If the CD player cover is opened for placing or taking off a CD, the anti-dust cover hides the laser head instead of the CD player cover, attaining the same object of keeping the laser head clean.

Generally, a conventional anti-dust cover driving device for a CD player, as shown in FIG. 1, includes a base body 1, an anti-dust cover 2 and a driving device (not shown in the Figure).

The base body 1 is mounted with a laser head base unit 10, having a rail 11 respectively formed at two sides of the laser head base unit 10, and a space on the base body 1 for the laser head base unit 10 to slide between the two rails 11. A laser head 10A is mounted on the laser head base unit 10, moving in a straight line. The laser head 10A is moved in this way for reading information from a CD, and has to read it all stored in the CD.

The anti-dust cover 2 has a anti-dust notch 20, and a slide groove 21 respectively at two sides of the notch 20 to fit and move on the rails 11 of the base body 1, with its moving direction parallel to that of the laser head 10A.

When the CD player cover is closed, the cover hides and prevents the laser head 10A from receiving dust. The anti-dust cover driving device, as shown in FIG. 1, does not operate when the CD player cover (not shown in the Figure) is closed. When the CD player cover is driving but does not reach the most opened position, the driving device moves the anti-dust cover 2, as shown in FIG. 2, letting the cover 2 hiding the laser head 10A. After the laser head 10A is completely hidden by the cover 2, then the CD player cover opens completely for a CD to be placed for playing. Then the CD is covered by the anti-dust cover 2, so the laser head 10A is not subjected to dust falling on the laser head 10A. If the CD player cover is closed again, the anti-dust cover 2 is retracted to its original position, as shown in FIG. 1, with the CD player cover hiding again the laser head 2 as described above.

Although the conventional anti-dust cover driving device has the function of preventing the laser head 10A from dust to fall thereon, the anti-dust cover and the laser head 10A move in the parallel direction, occupying a comparatively large space for its movement, moving out of the dimensions of the base body 1, as shown in FIG. 2. So a space should be left beside the base body 1 for the anti-dust cover 2 to move in and out, not convenient for practical use.

SUMMARY OF THE INVENTION

The main purpose of the invention is to offer a anti-dust driving device, in which the moving direction of the anti-dust cover is vertical to that of the laser head, the moving distance of the anti-dust cover is shortened relative to prior art devices, and the anti-dust cover does not move outside the dimensions of the base body.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
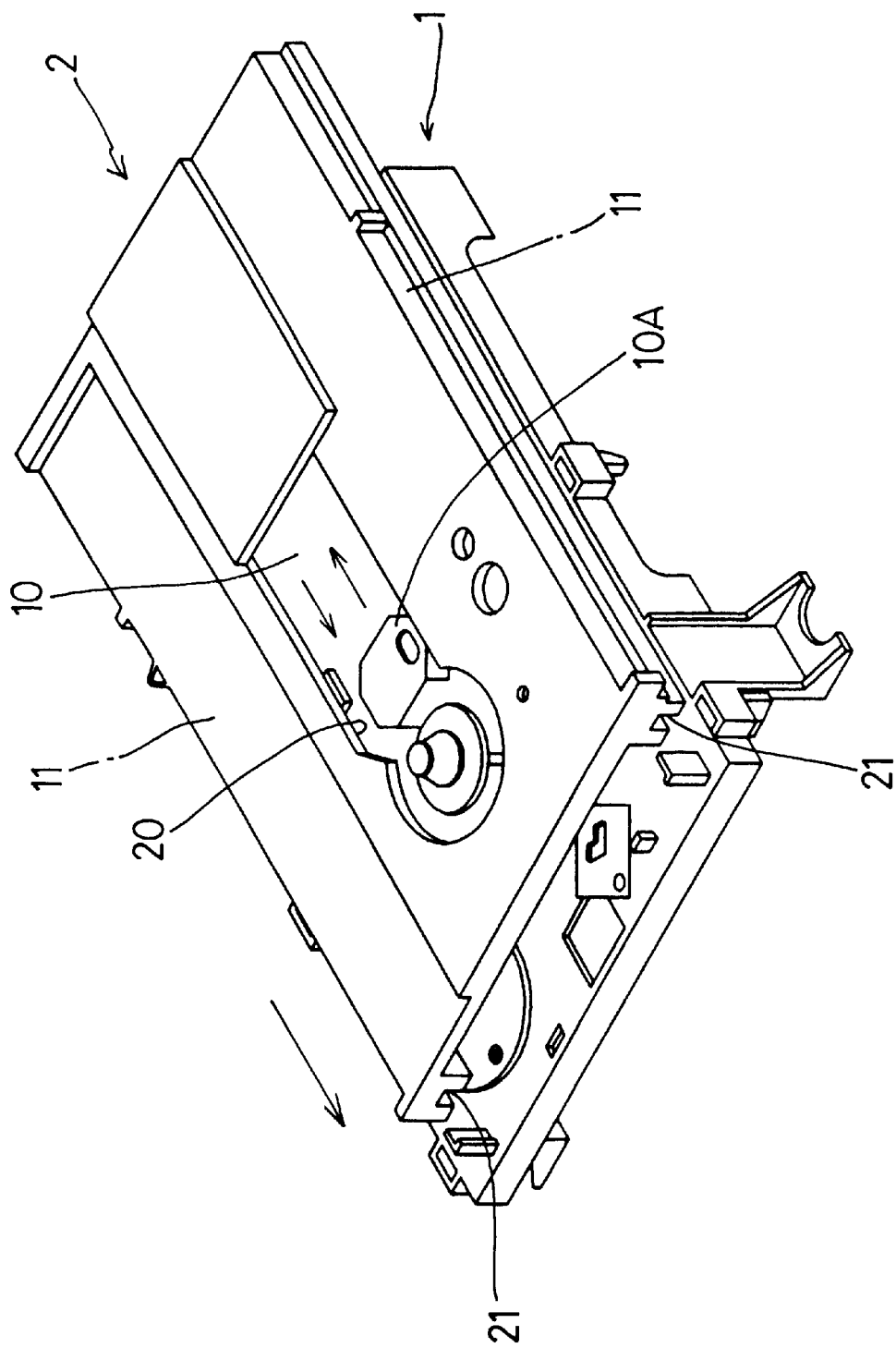
FIG. 1 is a perspective view of a conventional anti-dust cover for a CD player, with the anti-dust cover being in the unmoved original position.
Figure 2:
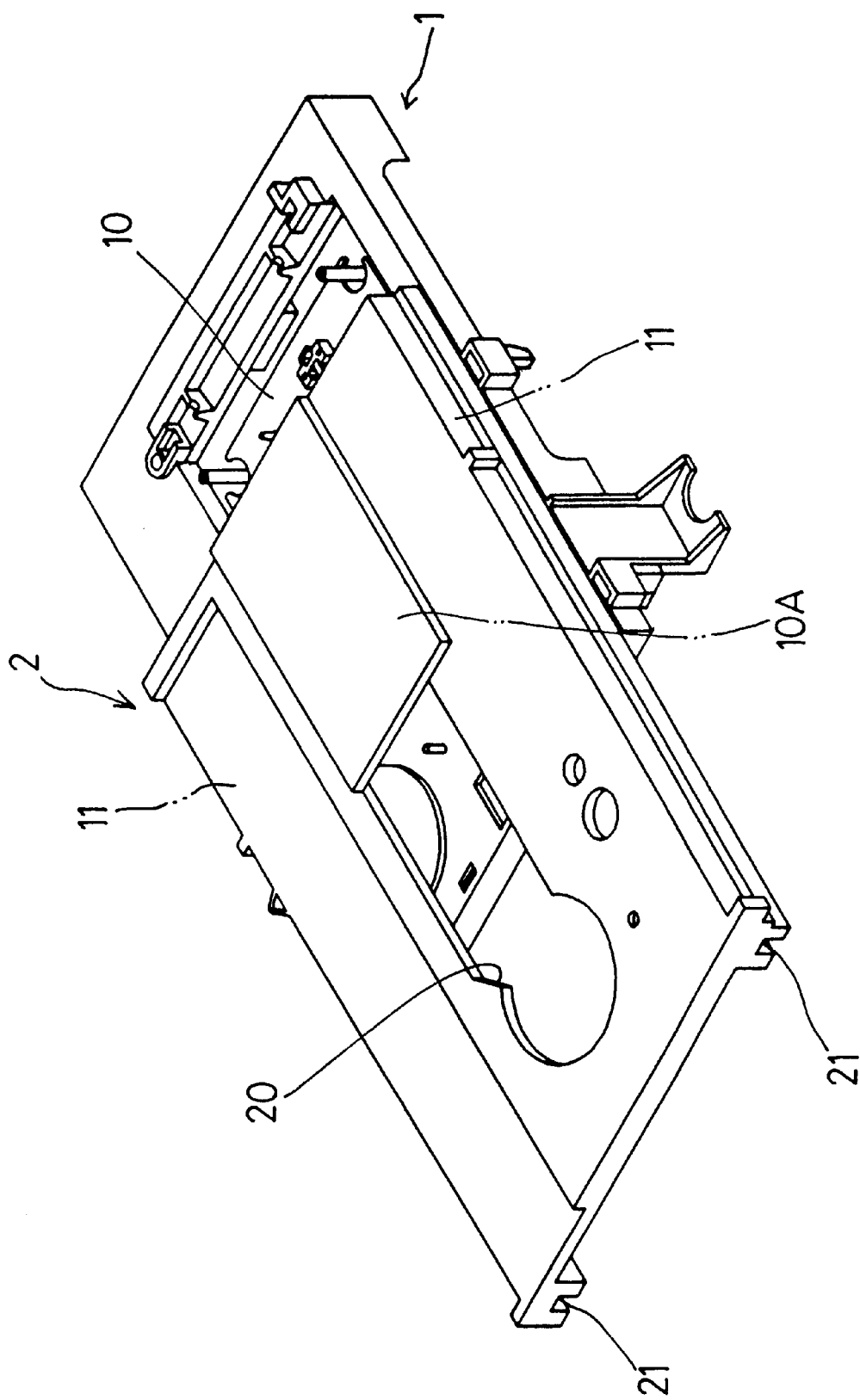
FIG. 2 is a perspective view of the conventional anti-dust cover for a CD player being in the moved position to a preset location.
Figure 3:
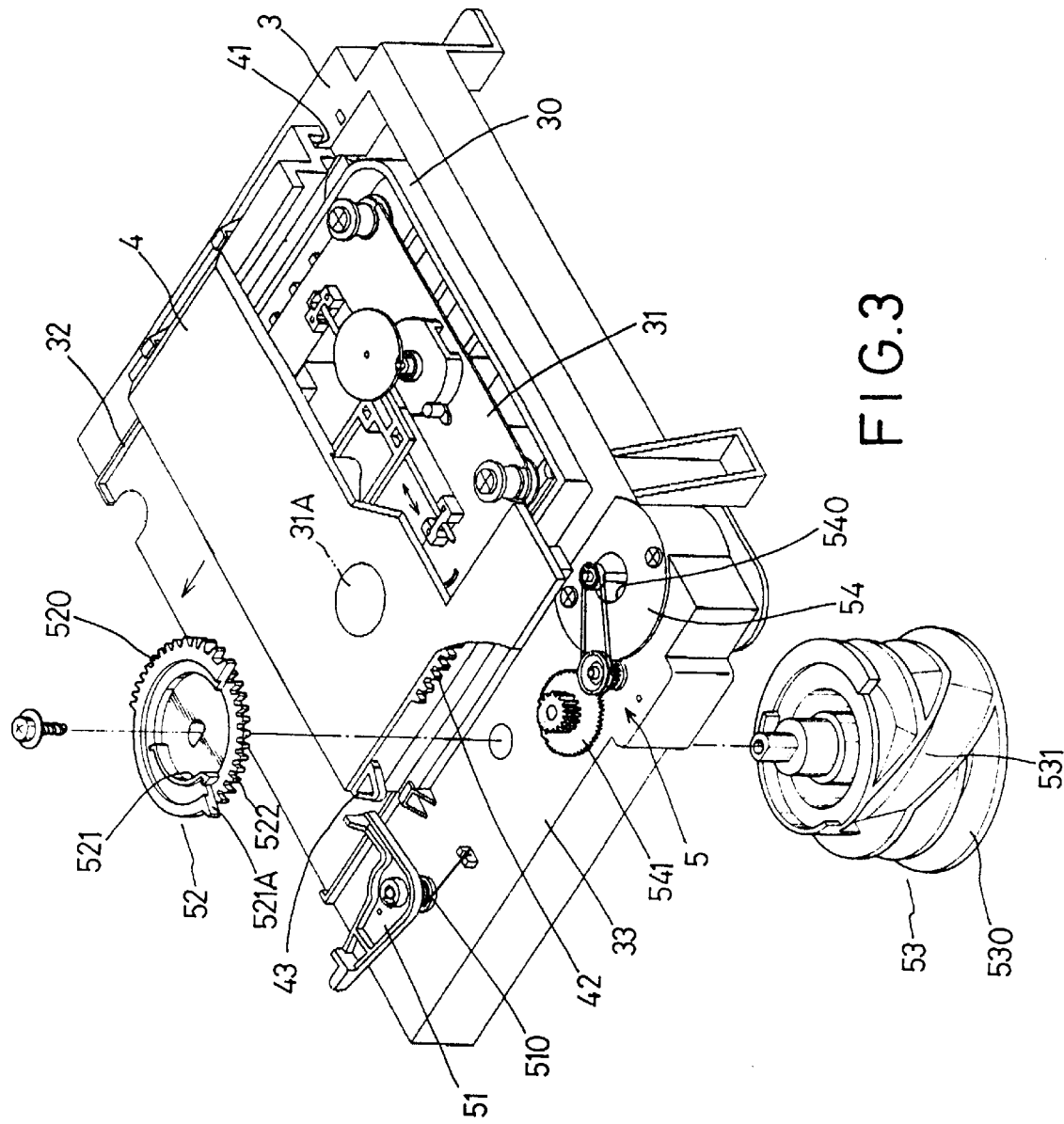
FIG. 3 is an exploded perspective view of an anti-dust cover driving device for a CD player in the present invention.

A preferred embodiment of a anti-dust cover driving device for a CD player in the present invention, as shown in FIG. 3, includes a base body 3, an anti-dust cover 4, and a driving device 5 as main components as the conventional anti-dust cover driving device for a CD player.

Figure 4:
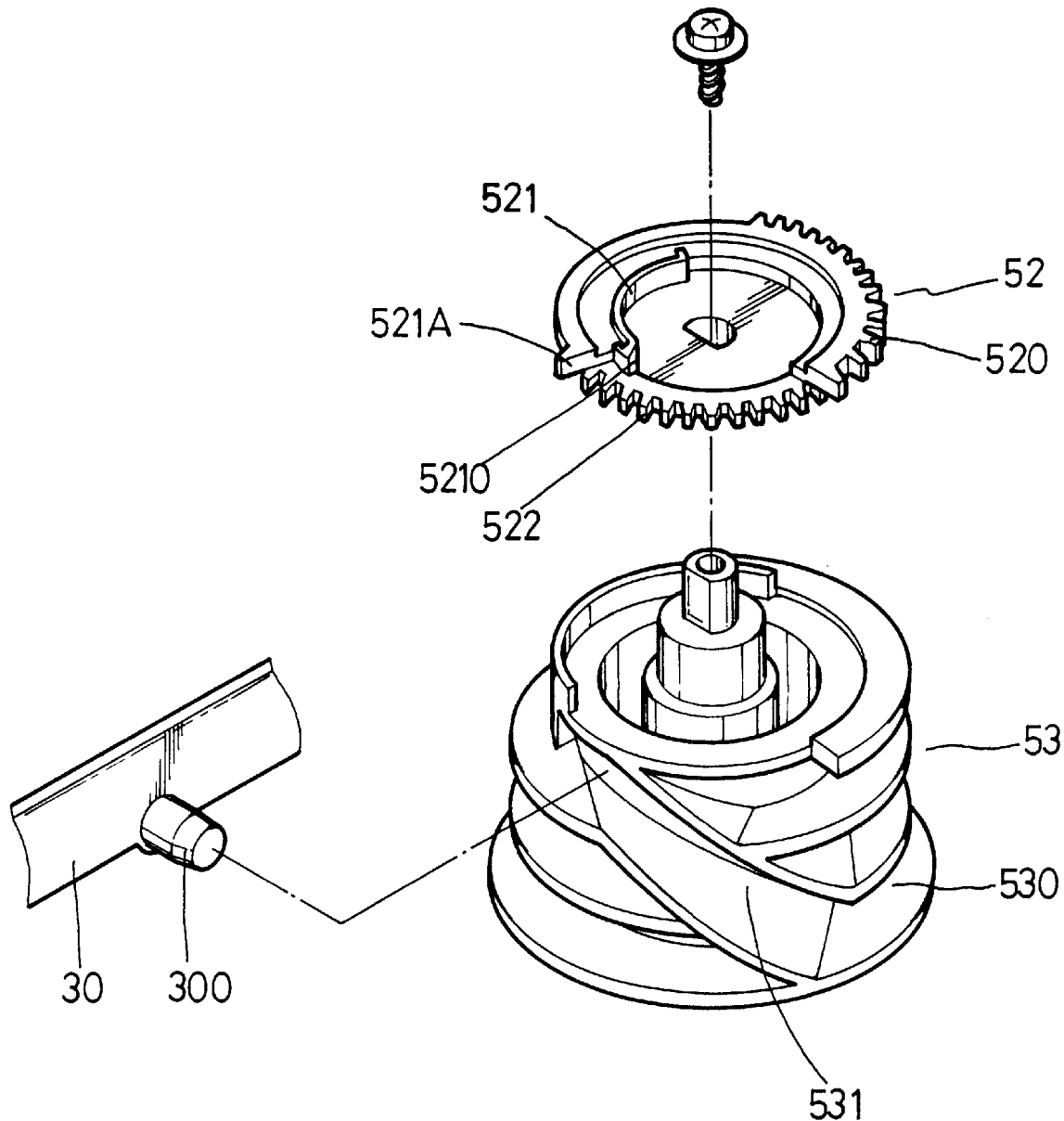
FIG. 4 is a enlarged perspective view of the components shown in FIG. 3.
Figure 6:
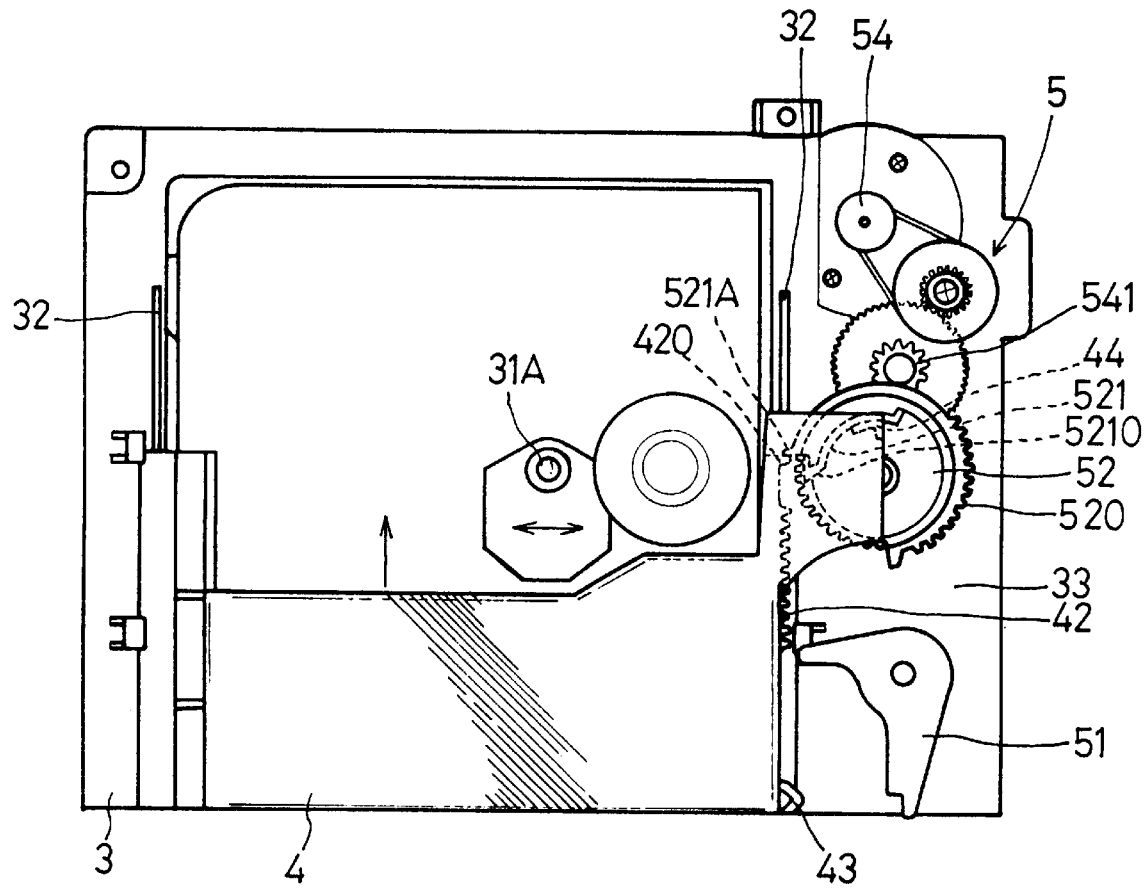
FIG. 6 is an upper view of the anti-dust cover for a CD player, with the anti-dust cover being in the original unmoved position in the present invention.
Figure 7:
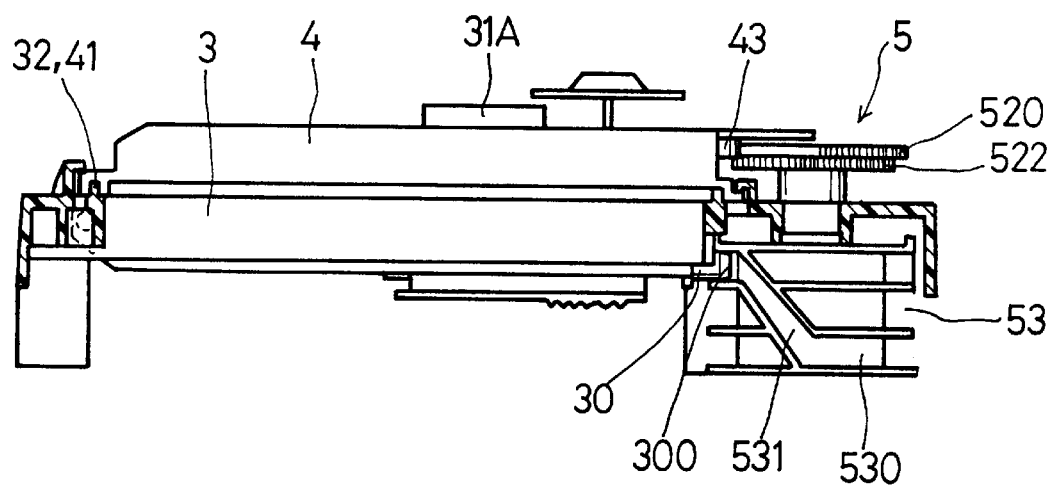
FIG. 7 is a side view of the anti-dust cover for a CD player, with the anti-dust cover being in the original unmoved condition in the present invention.

The base body 3 has a frame base 30 possible to be lifted and lowered, a projection 300 formed on a side of the frame base 30 for fitting in the driving device 5 so as to be moved up and down, as shown in FIGS. 4 and 7. A laser head base unit 31 is mounted on an upper surface of the frame base 30, having a laser head 31A as shown in FIG. 6. The base body 3 further has a slide rail 32 respectively at a left side and a right side of a mouth of the frame base 30, and a receiving base 33 formed at the left side of the slide rail 32 for receiving other components.

Figure 5:
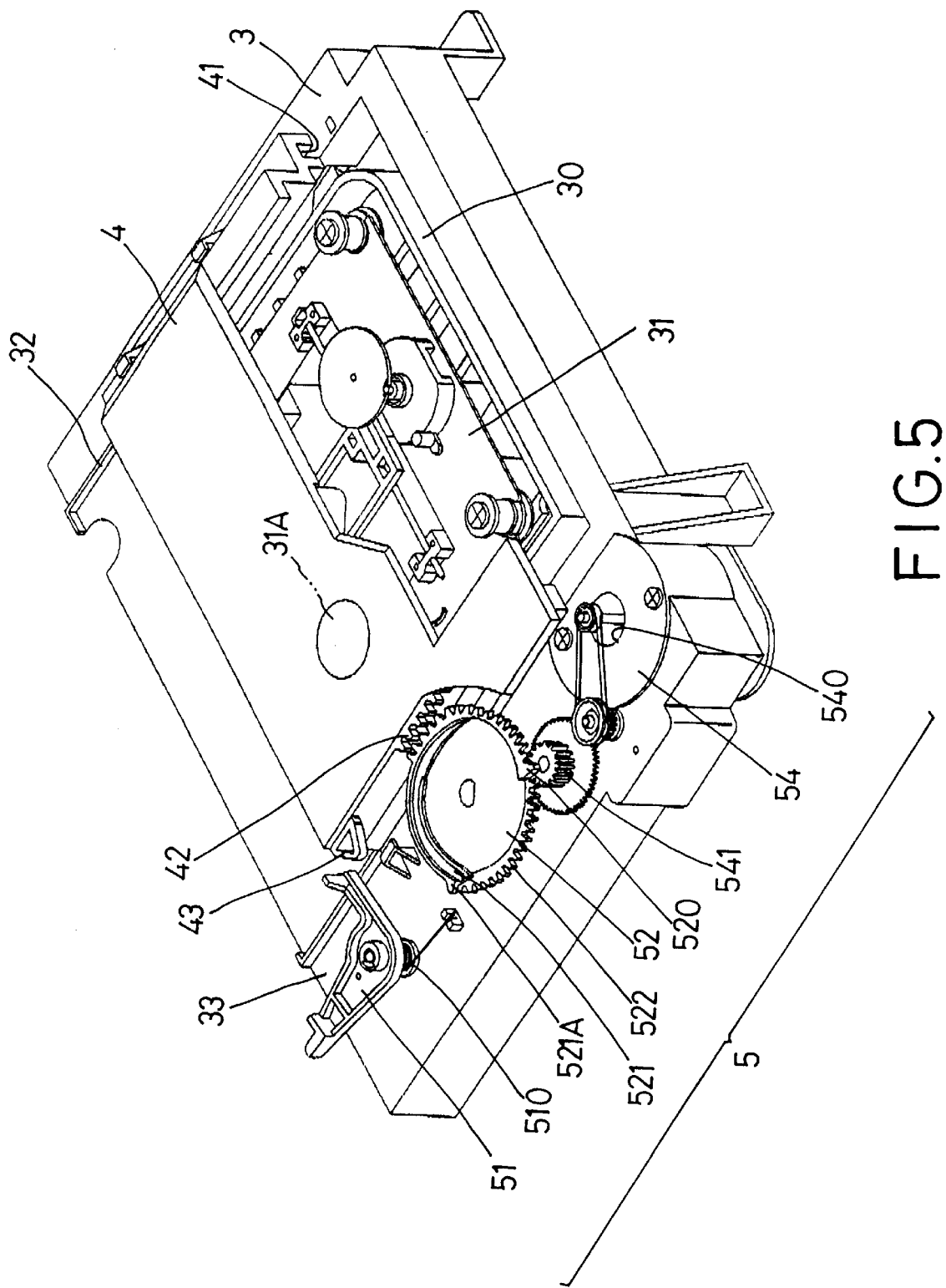
FIG. 5 is a perspective view of the anti-dust cover driving device for a CD player in the present invention.

The anti-dust cover 4 has two slide grooves 41 to slide along the slide rails 32 to furnish the anti-dust cover 4 with a moving function just as the conventional one. But the anti-dust cover 4 has a width smaller than the mouth of the frame base 30 so that the anti-dust cover 4 may hide the laser head 31A during sliding movement. Further, when the anti-dust cover 4 moves back to its original position, the CD player cover may hide the laser head 31A, also preventing dust from falling on the laser head 31A anti-dust cover 4. As shown in FIGS. 3, 5, and 6, the anti-dust cover 4 further has a rack 42 on a side wall facing the receiving base 33 of the base body 3, a stop 420 near one end of the rack 42 and near the driving device 5, a dove-tail contact means 43 on an end of the side of the rack 4 and near an outer side of the base body 3, and a curved shaft 44 located on the receiving base 33 as shown in FIG. 6.

The driving device 5 is shown in FIGS. 4 and 5, including an activating means 51, a gear 52, a shaft 53 and a power device 54.

The activating means 51 is pivotally combined on the receiving base 33 of the base body 3 that is elastically pulled by a torque spring 510 to move back. The activating means 51 can be pushed to move by the contact means 43 and to rotate for a preset angle when the anti-dust cover 4 moves to a preset position. Then one end of the activating means 51 activates an opening control device of the CD player cover (not shown in Figures) to let the CD player cover open. Thus, the anti-dust cover 4 covers above the laser head 31A to prevent dust from falling on the laser head 31A, in spite of the CD player cover opened.

The gear 52, as shown in FIGS. 3 and 4, is pivotally combined to the receiving base 33 of the base body 3, having a certain length of limit teeth 520 on an upper spherical edge to engage the rack 42 of the anti-dust cover 4, a projecting stop wall 521 formed in an inner side of the rest of the upper spherical edge and having a bent surface 5210 formed at its front end, a projection 521A formed at an outer side of the front end, complete driving teeth 522 formed around on a lower spherical edge. Then the engagement of the limit teeth 520 and the rack 42 can limit the anti-dust cover 4 to move within a certain limited distance, with the projecting stop wall 520 and the projection 521A stopping the anti-dust cover 4 from sliding at random after the anti-duct cover 4 is moved to the preset position with the rack 42 disengaging from the limit teeth 520.

The shaft 53, as shown in FIGS. 3 and 4, is also pivotally combined on the receiving base 33 of the base body 3, axially fixed with the gear 52 to move synchronously, having a circumferential horizontal groove 530 formed in a lower end, a spiral groove 531 extending spirally up from an end of the circumferential horizontal groove 530. The circumferential horizontal groove 530 and the spiral groove 531 communicate with each other and form a route for the projection 300 (shown in FIGS. 4, 7 and 9) of the frame base 30 of the base body 3 to firstly slide into the circumferential horizontal groove 530 and then move upward along the spiral groove 531 so that the frame base 30 may be lifted up by rotation of the shaft 53.

The power device 54 is also pivotally combined on the receiving base 33 of the base body 3, having a motor 540 for driving a transmitting gear 541 pivotally combined on the receiving base 33. The transmitting gear 541 engages the driving teeth 522 of the gear 52 so as to furnish power to the driving device 5 to move the anti-dust cover 4 and the frame base 33 with the laser head 31A mounted on.

When the anti-dust cover driving device is assembled together as shown in FIG. 5 and the power device 54 is energized, its operation is described as follows.

1. At first, as shown in FIGS. 6 and 7, the power device is still not powered, and the CD player cover is not opened yet, covering above the laser head 31A. So the anti-dust cover 4 does not have to hide the laser head 31A under this condition, with the laser head 31A hidden by the CD player cover. At the same time, the rack 42 of the anti-dust cover 4 does not engage any component of the driving device 5 and seems to slide at random, but the curved shaft 44 of the anti-dust cover 4 stops the projecting stop wall 521 of the gear 52 of the driving device 5, with the projection 521A contacting the stop 420 of the anti-dust cover 4, securing immovable the anti-dust cover 4.

Figure 8:
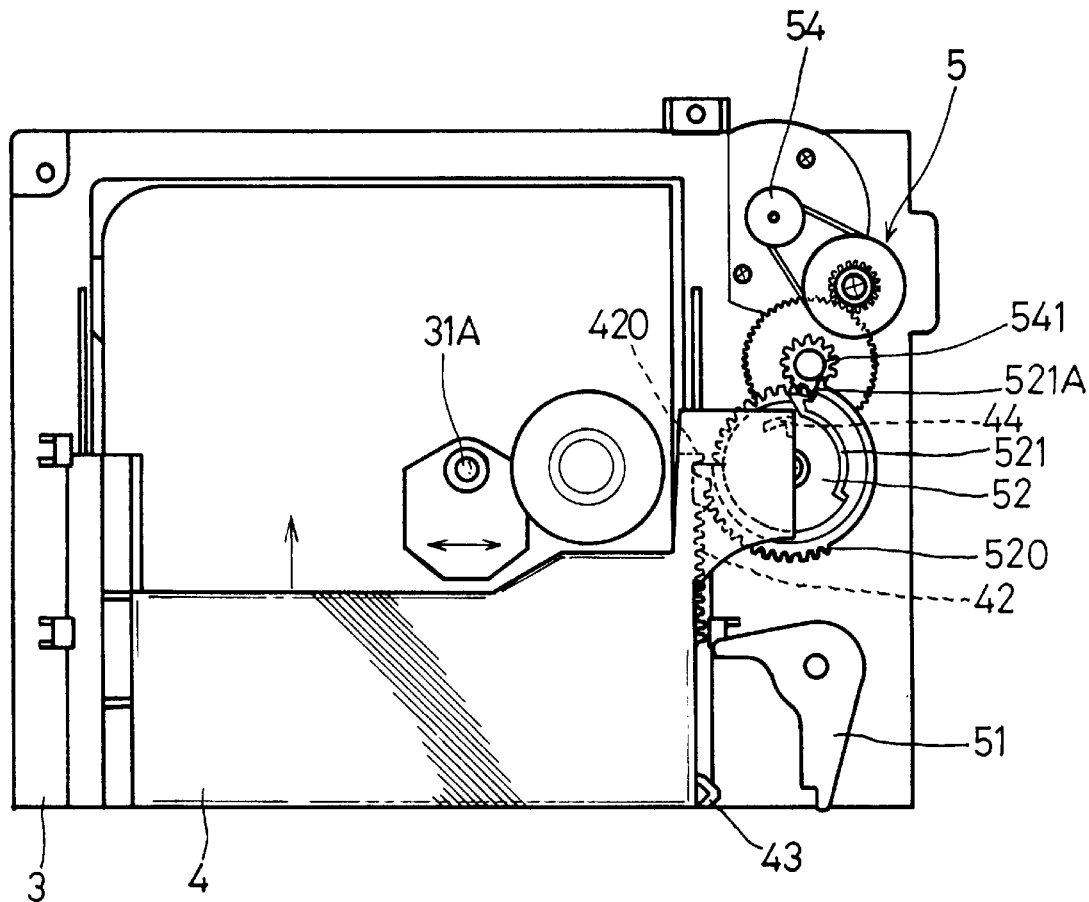
FIG. 8 is an upper view of the anti-dust cover driving device for a CD player, with the driving device being in operation in the present invention.
Figure 9:
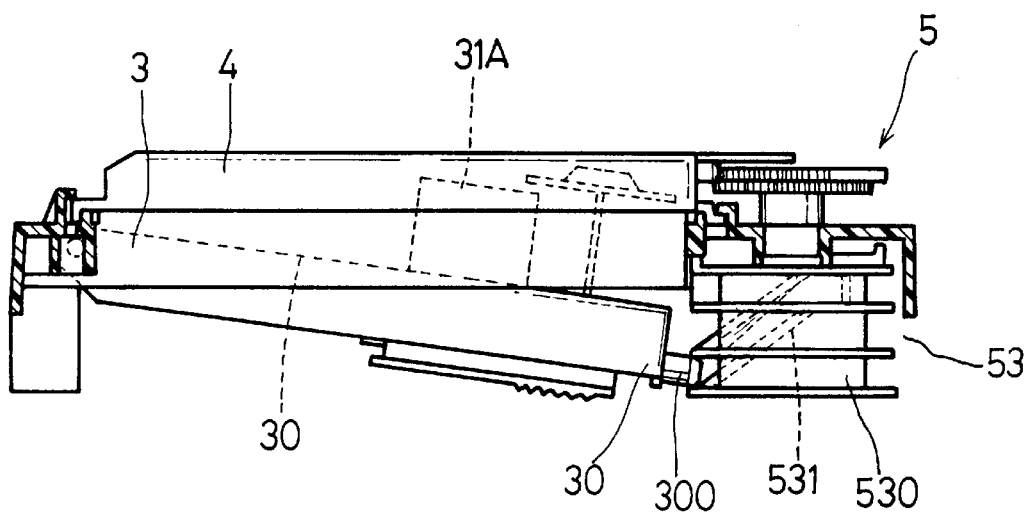
FIG. 9 is a side view of the anti-dust cover driving device for a CD player, with the driving device being in operation in the present invention.

2. Next, as shown in FIGS. 8 and 9, if the power device 5 is powered, the CD player cover is to be opened, but opening of the CD player cover is effected by the activating means 51. When the power device 5 is already powered, the transmitting gear 541 drives the gear 52 clockwise, and the end of the anti-dust cover 4 disengages from the stop projection 521A of the gear 52, with the projecting stop wall 521 sliding along the curved shaft 44 of the anti-dust cover 4, with the shaft 53 rotating clockwise together with the gear 52. Then the projection 300 of the frame base 30 moves down, sliding along the spiral groove 531 of the shaft 53, lowering the laser head 31A lower than the anti-dust cover 4 from the position shown in FIG. 7 to that shown in FIG. 9. Consequently, the anti-dust cover 4 cannot be hampered in its movement.

Figure 10:
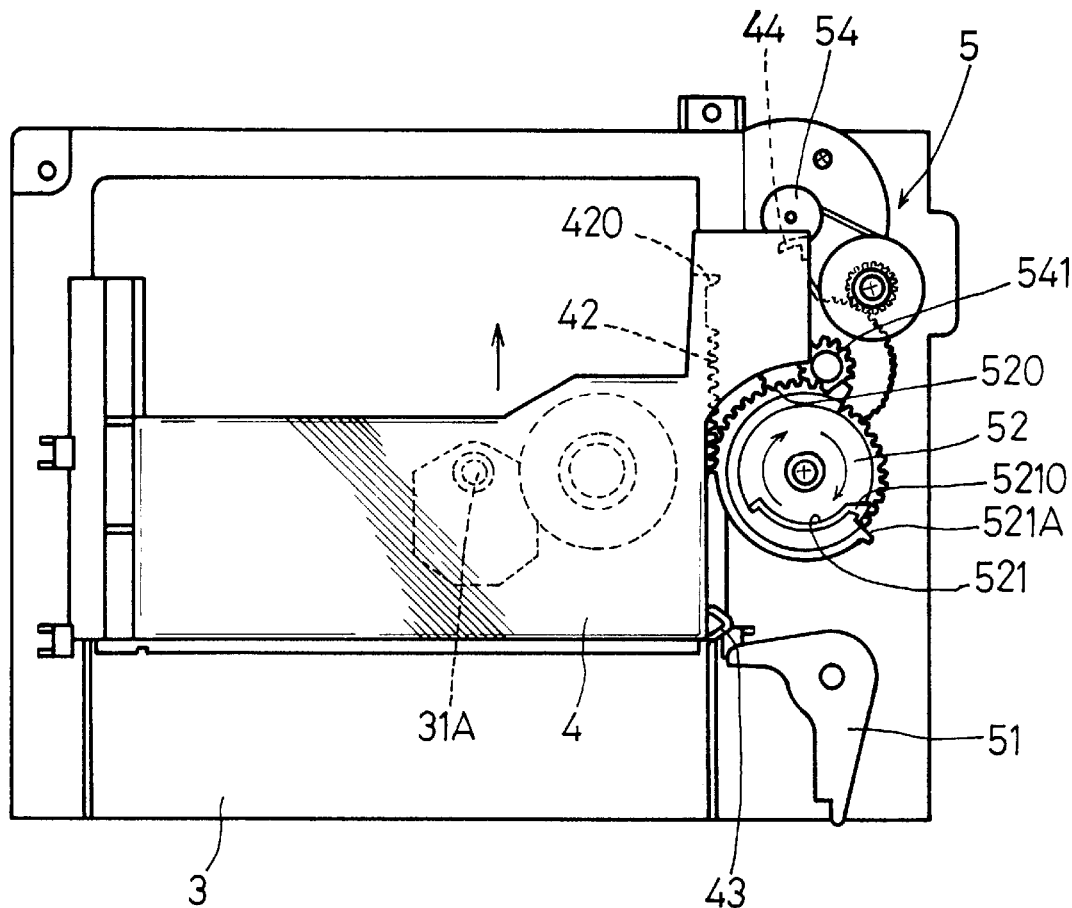
FIG. 10 is an upper view of the anti-dust cover driving device moving the anti-dust cover above a laser head in the present invention.
Figure 11:
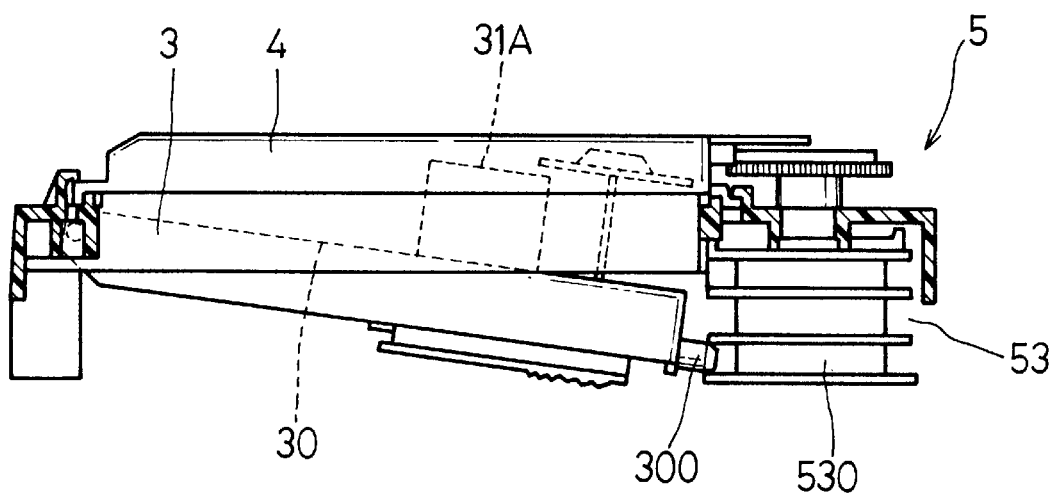
FIG. 11 is a side view of the anti-dust cover driving device moving down the laser head in the present invention.
Figure 13:
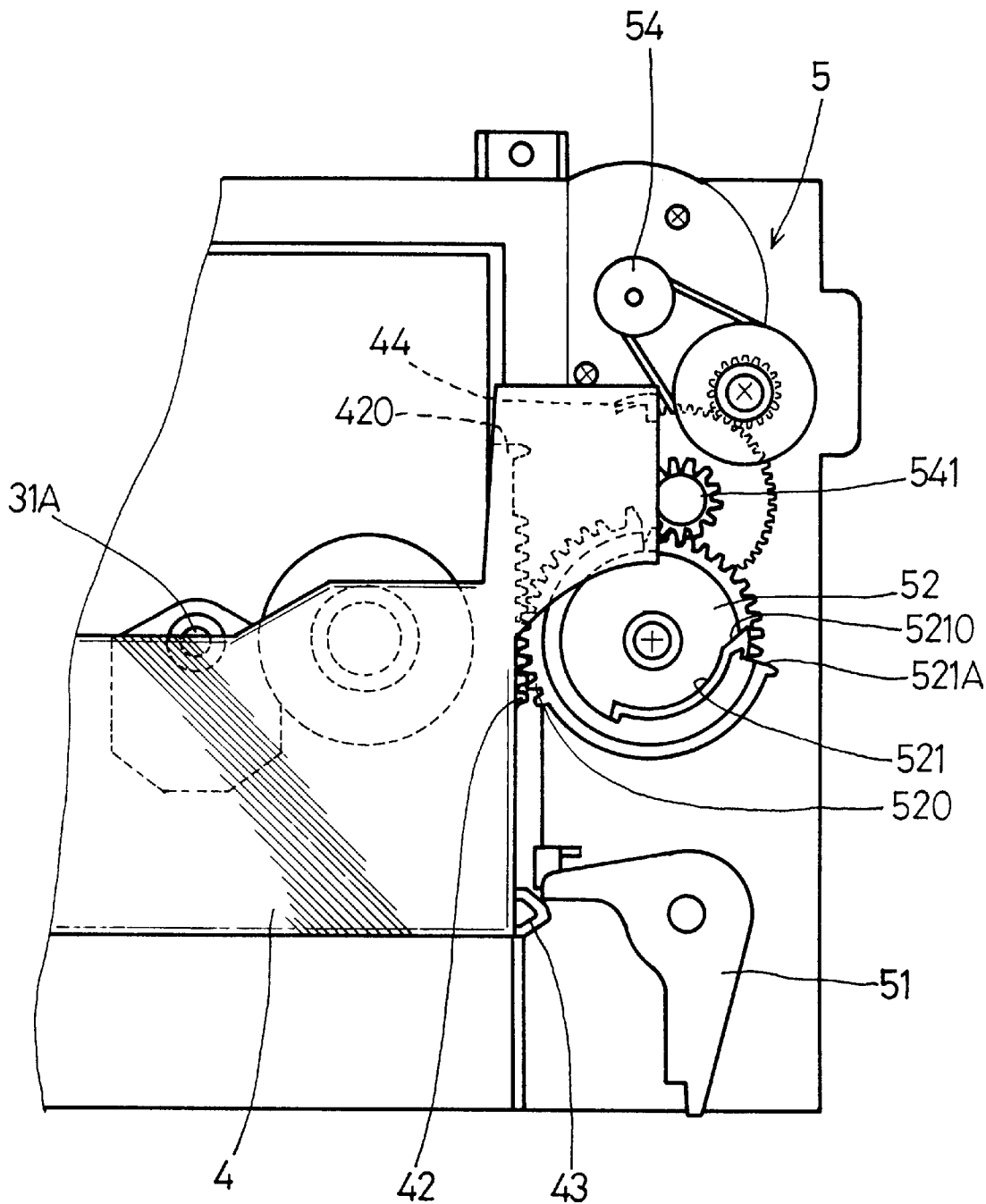
FIG. 13 is another partial enlarged upper view of the anti-dust cover being moved in the present invention.
Figure 15:
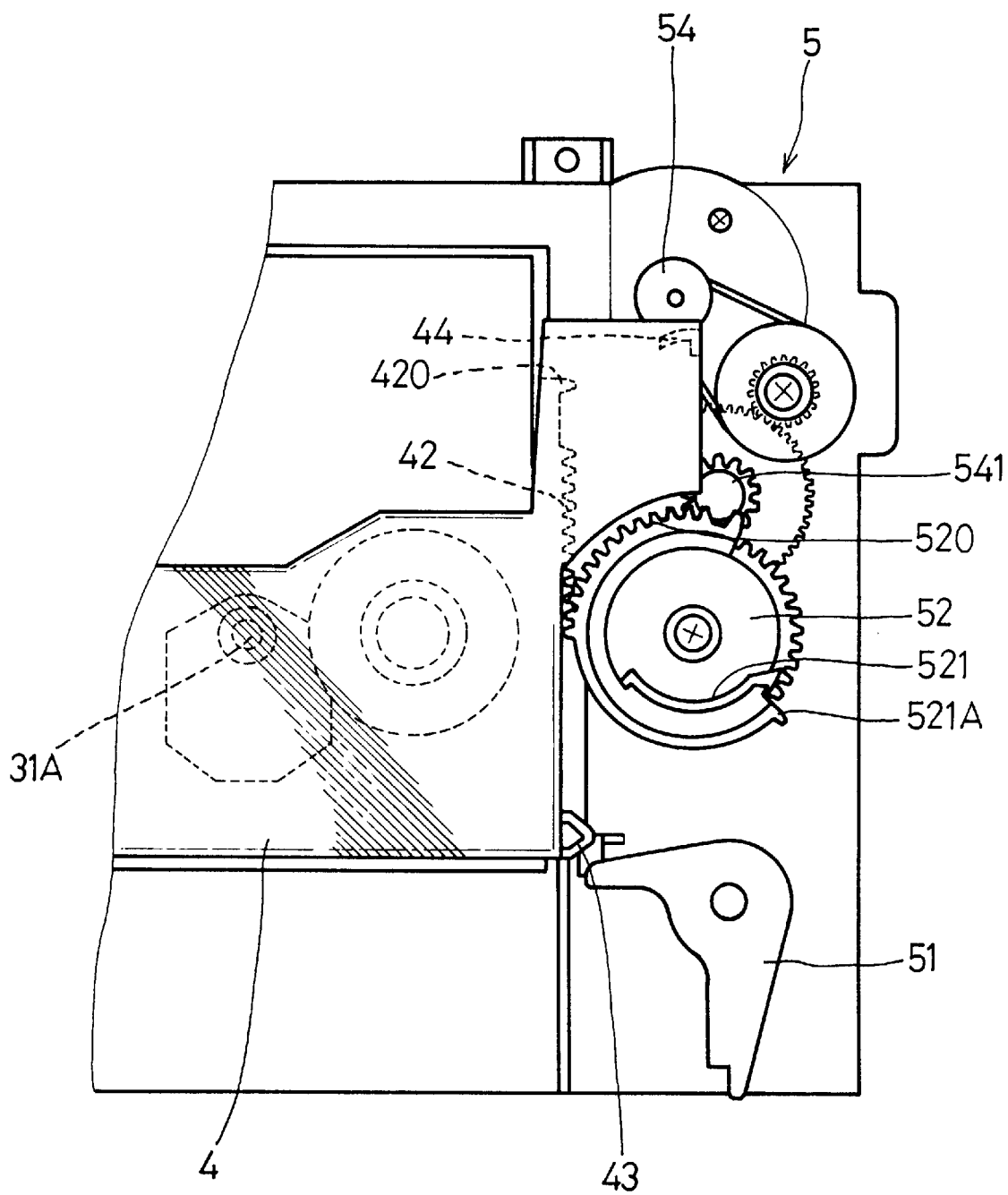

3. Next, as shown in FIGS. 10 and 11, continuing from the movement shown in FIGS. 8 and 9, as the gear 52 is driven by the transmitting gear 541, the projecting stop wall 521 may slide off and not stopped by the curved shaft 44, but the limit teeth 520 begins to engage the rack 42, moving the anti-dust cover 4 as shown in FIG. 13. In the process of the movement of the anti-dust cover 4, when the contact means 43 moves to contact the activating means 51 (as shown in FIG. 13), the means 51 commands the CD player cover to open. Then the anti-dust cover 4 already reached the preset point, hiding the laser head 21A, as shown in FIG. 15, with the control switch contacted to stop the power device 54. So there is no fear that dust may fall on the laser head 31A due to the opened CD player cover.

4. When the CD player cover is closed, the anti-dust cover 4 is to be driven by the gear 52, with the rack 42 engaging the limit teeth 520 of the gear 52, moved away from the laser head 31A. When the anti-dust cover 4 moves back to the original position where the rack 42 disengages from the limit teeth 520, the anti-dust cover 4 arrives at the preset point, not hiding the laser head 31A. But the gear 52 still rotates to drive the shaft 53 to move up the frame base 30 with the laser head 31A mounted on. Then the projecting stop wall 521 moves along with the bent surface 5210 moving to the outside of the curved shaft 44, forcing the projecting stop wall 521 contact and stopped by the curved shaft 44. Therefore, the anti-dust cover 4 may not move at random after leaving the laser head 31A and reaching the preset point, with the gear 52 still rotating. After the laser head 31A reaches the upper preset position, the gear 52 will stop, with the projecting stop wall 521 coming to contact with the stop 420, securing the anti-dust cover 4 stabilized, not sliding toward the laser head 31A, as shown in FIG. 6.

Figure 12:
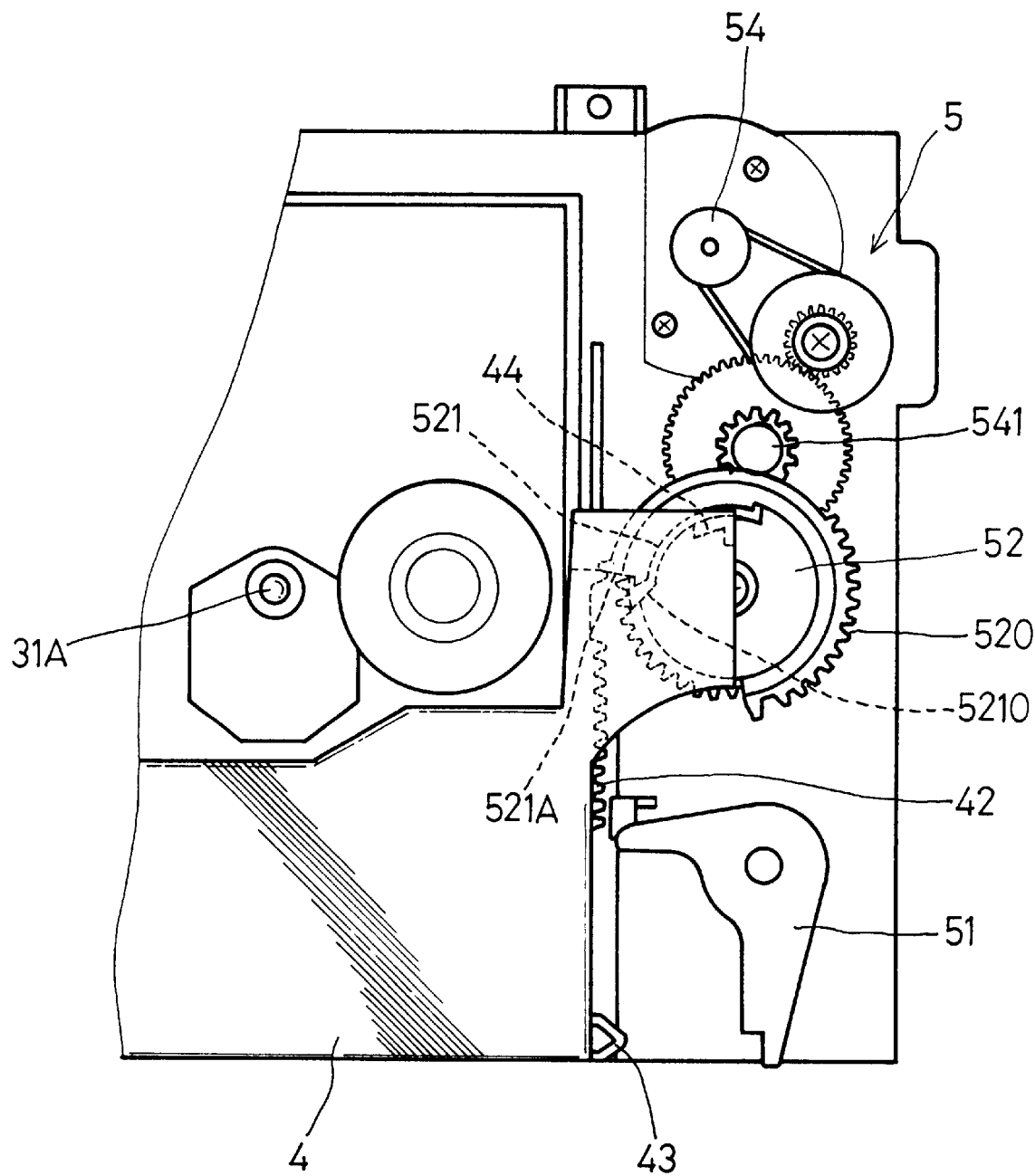
FIG. 12 is a partial enlarged upper view of the anti-dust cover being moved in the present invention.
Figure 14:
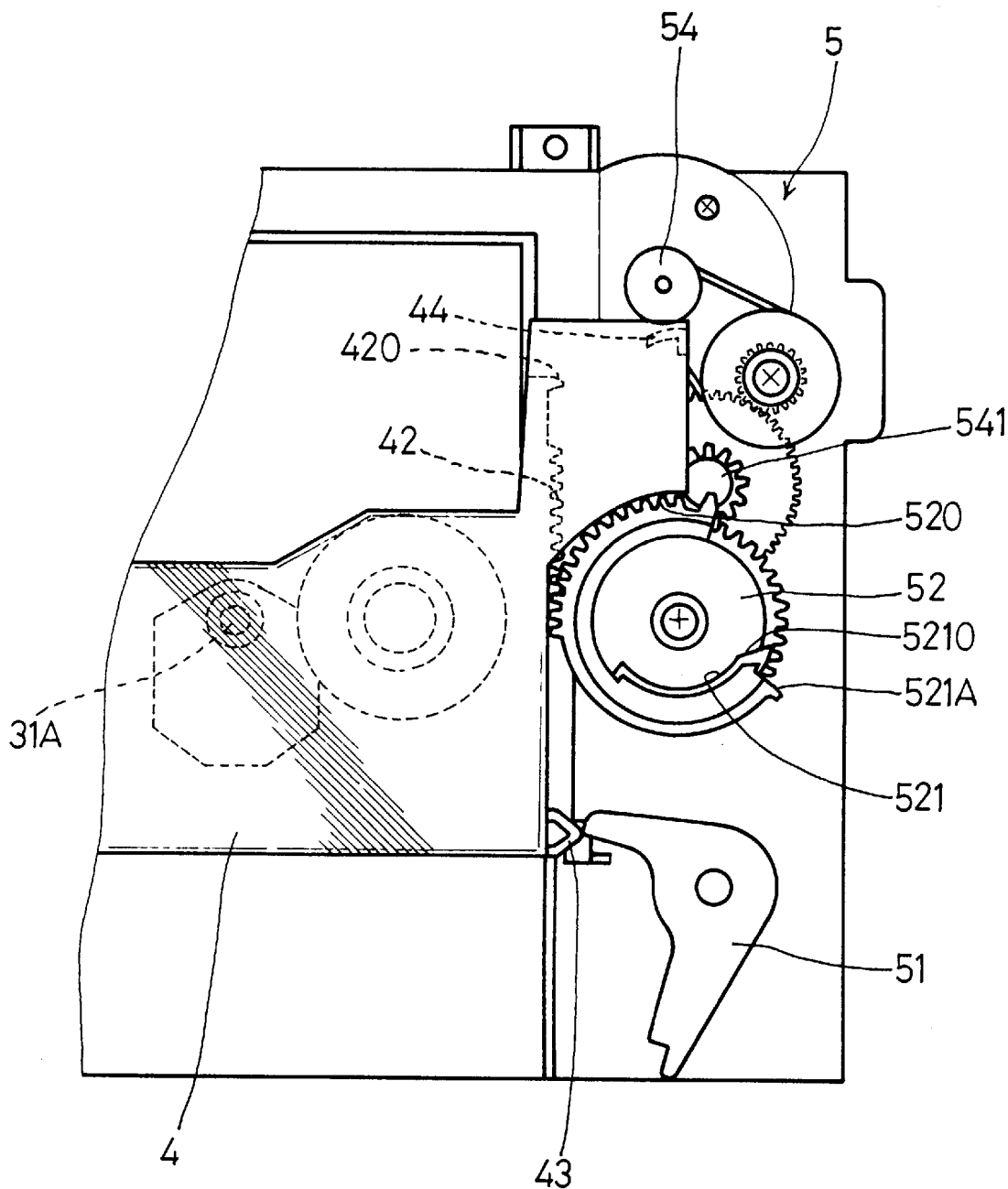
FIG. 14 is another partial enlarged upper view of the anti-dust cover being moved in the present invention; and, FIG. 15 is another partial enlarged upper view of the anti-dust cover being moved in the present invention.

5. In order to understand more clearly sliding movement of the anti-dust cover 4, FIGS. 12–15 should be referred to. FIG. 12 shows the gear 52 disengaging from the rack 42, with the projecting stop wall 521 contacting and stopped by the curved shaft 44 of the anti-dust cover 4, and with the projection 521A pushing the anti-dust cover 4, securing the anti-dust cover 4 in the position stabilized. Then as the gear 52 is rotated clockwise, the projecting stop wall 521 disengages from the curved shaft 44, and subsequently the limit teeth 520 moves to engages the rack 42 to move the anti-dust cover 4 slide with the contact means 43 contact the activating means 51, which then commands the CD player cover open. Meanwhile, the anti-dust cover 4 already hides the laser head 31A as shown in FIG. 14. Thus, although the CD player cover is open, the function of dust prevention does not disappear, with the anti-dust cover 4 hiding the laser head 31A. The activating means 51 moves back to its original position after contacting with the contact means 43 by means of the torque spring 510, as shown in FIG. 15.

As understood from the aforesaid description, the anti-dust cover 4 never moves out of the base body 2 in performing its dust preventing function. (As the moving direction of the anti-dust cover 4 is in a right angle to the moving direction of the laser head 31A, and this is the main difference from the conventional anti-dust cover.) In comparing the both, the conventional and the present anti-dust cover, the latter does not need a space outside the base body for the anti-dust cover to move back and forth as needed in the former, lessening the dimensions of the CD player for a great extent.

While the preferred embodiment of the invention has been described above, it will be recognized and understood that various modifications may be made therein and the appended claims are intended to cover all such modifications which may fall within the spirit and scope of the invention.

I claim:

1. An anti-dust cover driving device for a CD player comprising:

a base body with a laser head base unit mounted thereon, a laser head is movably mounted on said laser head base unit, said base unit further includes an anti-dust cover that covers said laser head base unit, said anti-dust cover includes a pair of slide grooves in an underside thereof, said base body further comprises a pair of slide rails, said slide rails are received in said slide grooves of said laser head base unit; and a driving device that moves said anti-dust cover in a linear travel path along said slide grooves, said linear travel path of said anti-dust cover is perpendicular to a travel path of said laser head; wherein said driving device includes a gear with a circular outer edge with limit teeth formed thereon, and a projecting stop wall formed in an interior portion on an upper side of said gear, said anti-dust cover has a rack with a linear array of teeth positioned to mesh with said limit teeth of said gear of said driving device, such that rotation of said gear of said driving device causes said anti-dust cover to move along said linear travel path of said anti-dust cover, and said anti-dust cover further includes a curved shaft, said curved shaft contacts said projecting stop wall when said anti-dust cover moves away from said laser head.

2. The anti-dust cover driving device for a CD player as claimed in claim 1, wherein:

said gear of said driving device further includes a stop projection formed at an outer side of a front end of said projecting stop wall, and said anti-dust cover also includes a stop, said stop of said anti-dust cover contacts said projecting stop of said gear of said driving device when said anti-dust cover moves to a preset position above said laser head and said gear of said driving device stops rotating, so that said anti-dust cover is secured and stabilized.

3. The anti-dust cover driving device for a CD player as claimed in claim 1, wherein:

said projecting stop wall is further provided with a bent surface at a start point that contacts said curve shaft of said anti-dust cover, said bent surface directs said curved shaft toward said projecting stop wall.

* * * * *